July 13, 1943.   O. V. MALMQUIST   2,324,308
HYDRAULIC TRANSMISSION MECHANISM
Filed March 20, 1941
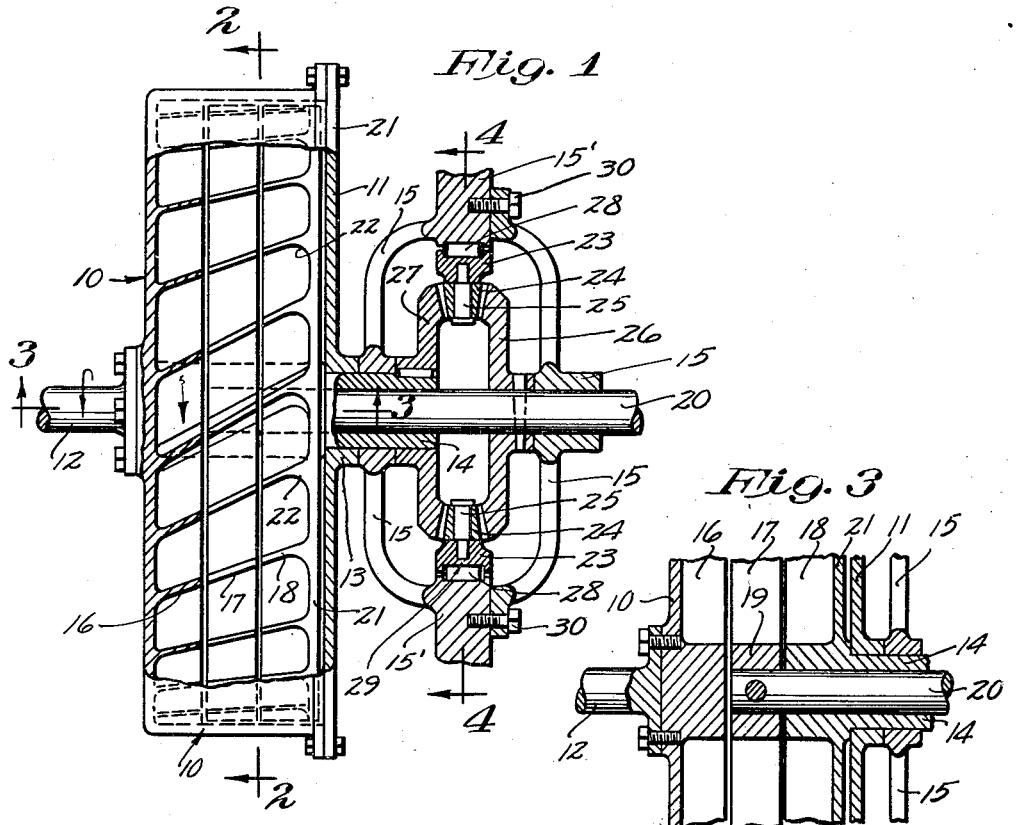
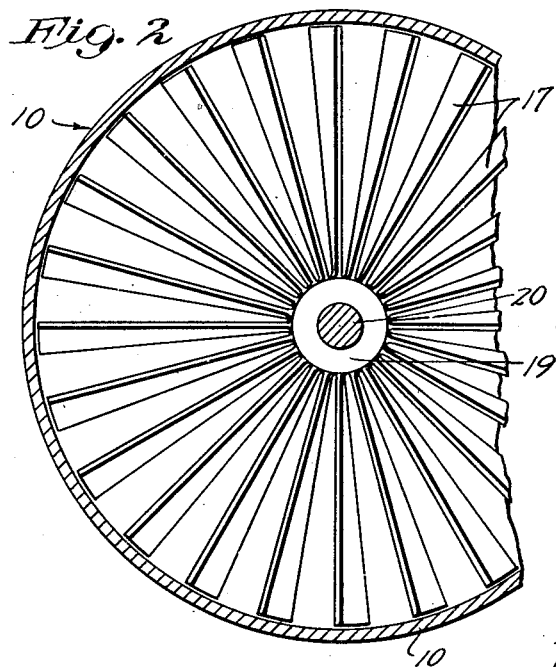
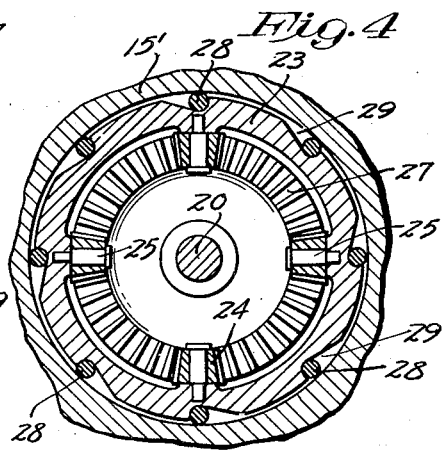
Inventor
Oscar V. Malmquist
By his Attorneys Patented July 13, 1943

2,324,308

UNITED STATES PATENT OFFICE 2,324,308

HYDRAULIC TRANSMISSION MECHANISM

Oscar V. Malmquist, Minneapolis, Minn.

Application March 20, 1941, Serial No. 384,308

1 Claim. (Cl. 74—189.5)

My invention relates to power transmission mechanism of the type wherein power is transmitted from a positively driven primary turbine wheel to a primary hydraulically driven turbine wheel by the deflection of the hydraulic fluid from the former to the latter.

In my invention, as an important feature, I employ a third or supplemental driven turbine wheel and in which arrangement the torque applied to the said third or supplemental turbine wheel is utilized as a booster or auxiliary power producing force to augment or increase the power transmitted to the final or power-driven shaft. In this improved device I employ a differential gear mechanism which involves a rotary pinion-equipped ring and a pair of bevel gears engaged with the pinions on opposite sides thereof. One of the bevel gears is secured to a power-receiving shaft which is connected and is directly driven by the intermediately located turbine wheel. The other bevel gear of the differential mechanism, by a sleeve or the like, is connected to and revolves with the reaction or supplemental wheel. The pinion-equipped ring of the differential mechanism is mounted to rotate in the runway of a relatively fixed or stationary frame.

The three turbine wheels are located within a liquid-containing casing which is preferably of drum-like form and which is mounted to rotate on the common axis of the driven shaft and of the differential mechanism. The primary power is delivered to this rotary casing preferably by a power-driven shaft, the axis of which is coincident with the axis of the rotary drum, turbine wheels, power-driven shaft, and differential mechanism. The pinion-equipped ring of the differential is free for rotation in one direction but by a one-way brake device is prevented from rotation in the opposite direction.

The primary or impeller wheel is preferably made integral with or directly secured to one head of the rotary casing; the driven turbine wheel radiates from and is secured to that end of the driven shaft that extends into the rotary casing, and its blades radiate from said shaft; the blades of the reaction wheel project obliquely from and are rigidly secured to a disc that is secured to the sleeve which extends from the casing, is journaled in the fixed frame and is connected to one of the main differential gears.

One form of the invention is illustrated in the accompanying drawing wherein like characters indicate like parts throughout the several views.

Referring to the drawing:

Fig. 1 is a view, partly in elevation and partly in axial section, showing the mechanism above briefly outlined;

Fig. 2 is a section taken on the line 2—2 of Fig. 1, some parts being broken away;

Fig. 3 is a section taken on the line 3—3 of Fig. 1; and

Fig. 4 is a section taken on the line 4—4 of Fig. 1, some parts being broken away.

The casing of the device is a drum-like structure 10 which, as shown, is provided with a rigidly secured detachable head 11 and is adapted to contain the impelling liquid which would preferably be a light oil. This drum 10 will be rotated by any suitable means, but preferably and as shown, is directly driven by an axially located power-driven shaft 12 which may be assumed to be the power shaft of an engine or the like. In this particular arrangement the head 11 is provided with a hub 13 that is journaled on a sleeve 14 which, in turn, is rotatively mounted in an arm of a fixed frame 15.

Within the rotary drum-like casing 10—11 are the three wheels 16, 17 and 18. The wheel 16 has been designated as the impeller or primary driving wheel; the wheel 17 has been designated as the turbine wheel; and the wheel 18 has been designated as the reaction or auxiliary wheel. The blades of the said three wheels are oblique in a common direction, as clearly shown in Fig. 1. The blades of the wheel 16, as shown, are preferably formed integral with one head of the rotary drum-like casing. The blades of the wheel 17 radiate from a hub 19 that is pinned or otherwise rigidly secured to a main driven shaft 20 which is extended through the sleeve 14 and is journaled in the fixed frame 15, as shown in Fig. 3. The blades of the wheel 18, as shown, are formed integral with or otherwise rigidly secured to a disc-like head 21 that is formed integral with or otherwise rigidly secured to the sleeve 14. By reference to Fig. 1 it will be noted that the blades of the wheel 18 join to the disc 21 by curved surfaces or fillets 22 that form sort of semi-closed pockets adjacent the disc 21.

The differential gear mechanism involves a ring 23 equipped with bevel pinions 24 journaled on studs 25; a bevel gear 26 that is keyed or otherwise rigidly secured to the main driven shaft 20; and a bevel gear 27 that is keyed or otherwise rigidly secured to the sleeve 14 which, in turn, and as already described, is connected to and carries the supplemental turbine wheel 18. The gears 26 and 27 mesh with opposite sides of the pinions 24. The pinion-equipped ring 23 is mounted to rotate in the yoke-like frame 15 and this is preferably accomplished by bearing rollers 28 that work in grooved runways formed in the ring 23 and in the surrounding portion of the frame 15. These bearing rollers 28 work in pockets 29 formed in the ring 23, and have a brake-like action that prevents rotation of the said ring 23 in a clockwise direction in respect to Fig. 4, but permit free rotation of said ring in a counter-clockwise direction in respect to said view. This brake action is important as will hereinafter appear in the description of the operation.

In the structure illustrated the fixed frame 15 is a yoke-like structure provided with one side or member that is rigidly but detachably secured by machine screws 30 or the like to the fixed main body portion 15' of said frame.

From the foregoing it will be noted that the power-driven shaft 12, the main driving shaft 20, and the turbine wheels 16, 17 and 18 are mounted on a common axis.

*Summary of operation*

When the drumlike casing 10—11 is positively rotated in the direction of the arrow marked on Fig. 1, the impeller or primary driving wheel 16 will, of course, be positively rotated in that direction and the oil or liquid discharged by its oblique blades against the oblique blades of the wheel 17 will transfer the torque from the wheels 16 and 17 and tend to drive the latter in the same direction as the said wheel 16. Of course, there will be slippage between the said wheels 16 and 17 due to the fluid nature of the oil or impelling liquid.

The liquid discharged from the blades of wheel 17, will be discharged against the blades of the auxiliary or reaction wheel 18 and the initial action will be a tendency to rotate said wheel 18 in a direction reverse from the above noted direction of rotation of the wheels 16 and 17.

Of course, when the wheel 17 is rotated in the direction stated, the differential gear 26, through the shaft 20, will be rotated in the same direction as the said wheel 17; and at the same time, the wheel 18 will tend to rotate the gear 27 in a reverse direction which, through the pinions, will tend to rotate said gear 26 in the direction first stated. Hence, in this starting action the wheel 18, by an initial rotation in the direction reverse to the rotation of wheel 17, will co-operate in the starting of wheel 17 and gear 26 in the direction stated. After the torque has been well used in initiating the rotation in the direction stated, the deflection of the liquid from wheel 17 to wheel 18 will cause the latter to rotate in or substantially in unison with the said wheel 17 and in a common direction therewith so that when this is accomplished, the said reaction wheel 18 acts substantially as a supplemental part of the wheel 17.

In the initiating or transmitting action, as above described, the pinion-equipped ring 23, by the brake-acting rollers, is held against backward rotation, but when the reaction wheel 18 becomes substantially companion to the wheel 17 and rotates in a common direction therewith, said pinion-equipped ring will be free to rotate in the above noted direction, to wit: a clockwise direction in respect to Fig. 4.

A preferred embodiment of the invention has been described and it will be understood that various alterations therein may be made within the scope of the invention herein disclosed and claimed.

What I claim is:

A rotary drum-like casing having circumferentially spaced blades acting as a primary impeller wheel, a second blade-equipped wheel rotatively mounted in said casing and operating as a turbine wheel proper, and a third blade-equipped wheel mounted in said casing for independent rotation and operative as a reaction wheel, said three wheels being co-axially mounted, side by side, and having approximately the same diameter and having their blades all oblique in the same direction in respect to their respective planes of rotation, the blades of said wheels having a lateral fluid impelling action in a direction at right angles to the axis of rotation, a differential gear mechanism connected between said reaction wheel and said turbine wheel, a power delivery shaft connected to said casing for rotating the same and its impeller acting blades, a power take-off shaft connected to said turbine wheel proper and extended axially from said casing, said reaction wheel having a sleeve-like hub rotatively mounted on said power take-off shaft and extended from said casing, a differential gear mechanism including reversely facing bevel gears and an interposed pinion-equipped brake ring, one of said bevel gears being connected to said power take-off shaft and the other to the hub of said reaction wheel, a fixed annular bearing in which said pinion-equipped ring is rotatively mounted, and means interposed between said ring and its annular bearing constructed and operating to permit free rotation of said pinion-equipped ring in one direction only.

OSCAR V. MALMQUIST.